(12) United States Patent
Heiks et al.

(10) Patent No.: US 6,853,764 B2
(45) Date of Patent: Feb. 8, 2005

(54) OPTICAL SWITCH ASSEMBLY AND METHOD FOR MAKING

(75) Inventors: Noel Heiks, Blacksburg, VA (US); David W. Sherrer, Blacksburg, VA (US)

(73) Assignee: Shipley Company, L.L.C., Marlborough, MA (US)

(*) Notice: Subject to any disclaimer, the term of this patent is extended or adjusted under 35 U.S.C. 154(b) by 0 days.

(21) Appl. No.: 09/852,709

(22) Filed: May 11, 2001

(65) Prior Publication Data

US 2002/0025107 A1 Feb. 28, 2002

Related U.S. Application Data

(60) Provisional application No. 60/228,430, filed on Aug. 28, 2000.

(51) Int. Cl.[7] ................................. G02B 6/35
(52) U.S. Cl. ........................ 385/20; 385/18; 385/52
(58) Field of Search ........................ 385/16, 18, 20, 385/21, 25, 52, 137, 49

(56) References Cited

U.S. PATENT DOCUMENTS

| | | |
|---|---|---|
| 3,864,018 A | 2/1975 | Miller |
| 4,120,923 A | 10/1978 | Kloker et al. |
| 4,150,870 A | 4/1979 | d'Auria |
| 4,165,496 A | 8/1979 | Di Domenico, Jr. et al. |
| 4,176,908 A | 12/1979 | Wagner |
| 4,210,923 A | 7/1980 | North et al. |
| 4,225,213 A | 9/1980 | McBride, Jr. et al. |
| 4,296,995 A | 10/1981 | Bickel |
| 4,325,604 A * | 4/1982 | Witte |
| 4,407,562 A | 10/1983 | Young |
| 4,415,229 A | 11/1983 | McCullough |
| 4,498,730 A | 2/1985 | Tanaka et al. |
| 4,639,074 A | 1/1987 | Murphy |
| 4,699,457 A | 10/1987 | Goodman |
| 4,725,114 A * | 2/1988 | Murphy ........................ 385/59 |
| 4,756,590 A | 7/1988 | Forrest et al. |
| 4,859,022 A * | 8/1989 | Opdahl et al. ................. 385/20 |
| 4,932,745 A | 6/1990 | Blonder |
| 4,973,127 A * | 11/1990 | Cannon et al. ................. 385/56 |
| 5,044,711 A * | 9/1991 | Saito ............................. 385/65 |
| 5,123,073 A | 6/1992 | Pimpinella |
| 5,127,084 A | 6/1992 | Takahashi |
| 5,135,590 A | 8/1992 | Basavanhally et al. |
| 5,177,804 A | 1/1993 | Shimizu et al. |
| 5,179,609 A | 1/1993 | Blonder et al. |
| 5,181,216 A | 1/1993 | Ackerman et al. |
| 5,185,825 A * | 2/1993 | Shigematsu et al. ........... 385/20 |
| 5,185,846 A | 2/1993 | Basavanhally et al. |
| 5,187,758 A | 2/1993 | Ueda et al. |
| 5,257,332 A | 10/1993 | Pimpinella |

(List continued on next page.)

FOREIGN PATENT DOCUMENTS

| JP | 63-85522 | * 4/1988 |
|---|---|---|
| JP | 1999305151 A | 11/1999 |

Primary Examiner—Hemang Sanghavi
Assistant Examiner—Mike Stahl
(74) Attorney, Agent, or Firm—Niels Haun; Jonathan D. Baskin

(57) ABSTRACT

An assembly and a method for accurately aligning optical fibers in an optical switch are described. An optical switch assembly is described having a pair of optical arrays mounted on a mounting apparatus. The mounting apparatus may include a base structure with either integral rails or affixed fibers. Alternatively, the mounting apparatus may include a base structure with grooves and a plurality of spheres in the grooves. An alternative arrangement includes a base structure with some grooves extending transverse to other grooves and mounting structures in each groove. One of the optical arrays is rendered immobile while the other array is freely movable on the mounting apparatus. Switching is provided by moving the movable fiber array relative to the fixed fiber array.

50 Claims, 6 Drawing Sheets

U.S. PATENT DOCUMENTS

| | | | |
|---|---|---|---|
| 5,297,228 A | 3/1994 | Yanagawa et al. | |
| 5,337,384 A | 8/1994 | Basavanhally et al. | |
| 5,357,590 A | 10/1994 | Auracher | |
| 5,379,361 A | 1/1995 | Maekawa et al. | |
| 5,390,266 A | 2/1995 | Heitmann et al. | |
| 5,440,655 A | 8/1995 | Kaplow et al. | |
| 5,461,683 A * | 10/1995 | Harman | 385/21 |
| 5,483,608 A | 1/1996 | Yokomachi et al. | |
| 5,499,309 A | 3/1996 | Kozuka et al. | |
| 5,500,910 A | 3/1996 | Boudreau et al. | |
| 5,500,911 A | 3/1996 | Roff | |
| 5,555,333 A | 9/1996 | Kato | |
| 5,566,262 A | 10/1996 | Yamane et al. | |
| 5,568,585 A | 10/1996 | Kramer | |
| 5,602,951 A | 2/1997 | Shiota et al. | |
| 5,611,006 A | 3/1997 | Tabuchi | |
| 5,623,564 A | 4/1997 | Presby | |
| 5,699,463 A | 12/1997 | Yang et al. | |
| 5,732,167 A | 3/1998 | Ishiko et al. | |
| 5,778,123 A | 7/1998 | Hagan et al. | |
| 5,785,825 A | 7/1998 | Hwang et al. | |
| 5,828,800 A | 10/1998 | Henry et al. | |
| 5,901,262 A | 5/1999 | Kobayashi et al. | |
| 5,909,524 A | 6/1999 | Tabuchi | |
| 5,920,665 A * | 7/1999 | Presby | 385/16 |
| 6,045,270 A | 4/2000 | Weiss et al. | |
| 6,056,696 A | 5/2000 | Kallman | |
| 6,064,781 A | 5/2000 | Seibold et al. | |
| 6,101,299 A | 8/2000 | Laor | |
| 6,118,917 A | 9/2000 | Lee et al. | |
| 6,160,936 A | 12/2000 | You et al. | |
| 6,234,687 B1 | 5/2001 | Hall et al. | |
| 6,328,479 B1 | 12/2001 | Schofield et al. | |
| 6,393,174 B1 * | 5/2002 | Karaguleff et al. | 385/16 |
| 6,393,175 B1 | 5/2002 | Jurbergs et al. | |
| 6,477,303 B1 | 11/2002 | Witherspoon | |
| 6,519,382 B1 * | 2/2003 | Jurbergs et al. | 385/18 |
| 2001/0041026 A1 * | 11/2001 | Steinberg et al. | 385/20 |
| 2001/0048785 A1 | 12/2001 | Steinberg | |
| 2002/0025104 A1 | 2/2002 | Steinberg et al. | |
| 2002/0028037 A1 | 3/2002 | Steinberg et al. | |
| 2002/0146194 A1 | 10/2002 | Sherrer et al. | |
| 2002/0181854 A1 | 12/2002 | Steinbereg et al. | |
| 2003/0108272 A1 * | 6/2003 | Sherrer et al. | 385/16 |

* cited by examiner

OPTICAL SWITCH ASSEMBLY AND METHOD FOR MAKING

This application claims priority from provisional application Ser. No. 60/228,430, filed Aug. 28, 2000, the entire disclosure of which is incorporated herein by reference.

BACKGROUND

The present invention generally relates to optical switches, and more particularly to an assembly and a method for ensuring accurate alignment of optical fibers within an optical switch.

Conventional optical switches operate by displacing at least one of the fibers to contact the other fiber (closed position) or to release contact with the other fiber (opened position). Generally, die optical fibers connect one another at aids which are transverse to the longitudinal axis of the fibers and coplanar to one another. In the closed position, input light is transmitted from one optical fiber to the other with little or no transmission loss. In the opened position, input light is reflected from one of the fibers, leading to complete or partial transmission loss. Complete transmission loss occurs during total internal reflection, when light approaches a dielectric interface at or above a critical angle and is thereby inhibited from being transmitted to the other optical fiber. When the angle is below the critical angle, or the distance between the optical fibers is sufficiently small, some input light may cross the gap between the optical fibers and thereby frustrate the total internal reflection. An example of such a conventional optical switch is described in U.S. Pat. No. 5,390,266 (Heitmann et al.).

One disadvantage in conventional optical switches is obtaining an accurate fiber to fiber alignment. An accurate alignment between fibers assures low insertion loss. For example, a displacement done fiber relative to the other, either horizontally or vertically, of more than 1 micron will likely produce unacceptable insertion loss.

The invention provides an optical switch assembly that includes a fixed optical array, a movable optical array, a plurality of first optical fibers mounted on the fixed optical array and a plurality of second optical fibers mounted on the movable optical array, and a mounting apparatus. The fixed optical array is immobile relative to the mounting apparatus and the movable optical may is movable along the mounting apparatus.

The invention also provides a method for making an optical switch assembly. The method includes positioning a plurality of first optical fibers in a first support structure and a plurality of second optical fibers in a second support structure, mounting the first and second support structures on at least one mounting apparatus and affixing one of the first and second support structures to the mounting apparatus.

The foregoing and other advantages and features of the invention will be more readily understood from the following detailed description of the invention, which is provided in connection with the accompanying drawings.

DETAILED DESCRIPTION OF PREFERRED EMBODIMENTS

Figure 1:
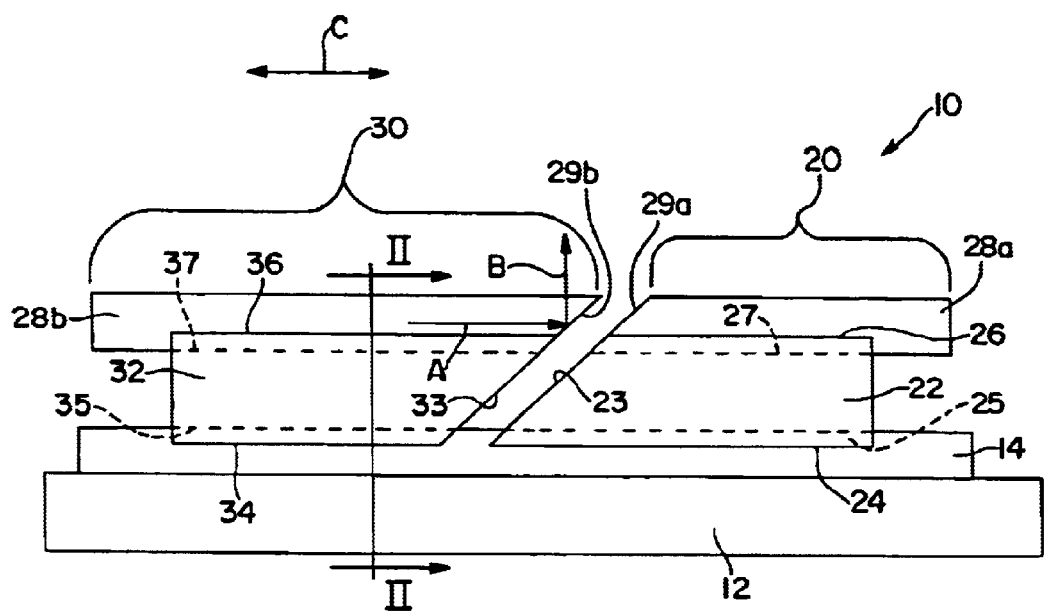
FIG. 1 is a side view of an optical switch assembly constructed in accordance with an embodiment of the invention.
Figure 2:
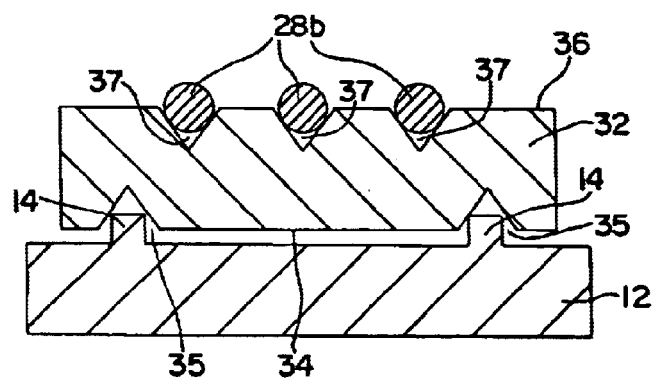
FIG. 2 is a cross-sectional view taken along line II—II of the optical switch assembly of FIG. 1.

Referring to FIGS. 1–2, in which like numerals designate like elements, an optical switch assembly 10 is shown including a base structure, such as a substrate 12, having a pair of mounting structures, shown as rails 14, a fixed optical array 20 and a movable optical array 30. The fixed optical array 20 includes a support structure, such as a chip 22, that has a face 23 and first and second surfaces 24, 26. The first surface 24 includes a plurality of first surface grooves 25, and the second surface 26 includes a plurality of second surface grooves 27. The movable optical array 30 includes a support structure, such as a chip 32, that has a face 33 and first and second surfaces 34, 36. The first surface 34 has a plurality of first surface grooves 35, and the second surface 36 has a plurality of second surface grooves 37. The chips 22, 32 and the substrate 12 are preferably formed of silicon.

Each of the optical arrays 20, 30 is mounted on the substrate 12. Specifically, the fixed array 20 is mounted such that the rails 14 extend into the grooves 25. Preferably, an adhering material is utilized to place the rails 14 and the grooves 25 immovable relative to each other. The movable array 30 is mounted such that the rails 14 extend into the grooves 35 in such a way as to permit free movement of the array 30 along the rails 14.

Upon each of the optical ways 20, 30 are mounted one or more optical fibers, which are preferably formed of silica. As shown, a plurality of optical fibers 28b are mounted within the grooves 37 of the chip 32, and corresponding optical fibers 28a are mounted within the grooves 27 of the chip 22. The optical fibers 28a, 28b may be adhered to the grooves 27, 37 through the use of an adhering material or mechanism (not shown). Any suitable adhering material or mechanism may be used, such as, for example, ultraviolet curable epoxy, solder, aluminum dioxide direct bonding, or solgel glass.

The optical fibers 28a, 28b have endfaces, respectively, endfaces 29a, 29b. The optical switch assembly 10 is shown in FIG. 1 with the optical arrays 20, 30 in the opened position with the endfaces 29a, 29b being separated a distance. In such a position, as light travels down the optical fiber 28b in a direction A, the light meets the endface 29b, which acts as a dielectric interface, and is translated into reflected light which is reflected in a direction B. In the closed position, the input light passes through the endfaces 29a, 29b and continues its transmission from the optical fiber 28a to another optical fiber. By moving the optical array 30 in a direction C, the optical switch will be placed in either an opened or a closed position. Although not shown, another fiber array may be placed vertically with respect to the chip 32 to receive reflected light B.

Figure 3:
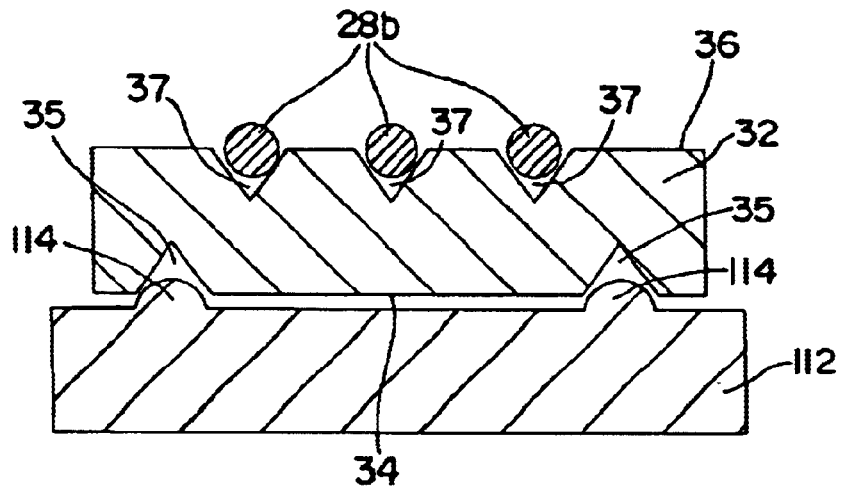
FIG. 3 is a cross-sectional view of an optical switch assembly constructed in accordance with another embodiment of the invention.

The rails 14 as illustrated in FIGS. 1–2 are shaped having a rectangular configuration. However, it is to be understood that any suitably shaped rail may be utilized. For example, a substrate 112 is shown in FIG. 3 which differs from the substrate 12 in that it includes a pair of rails 114 which are semi-circular in configuration.

Figure 4:
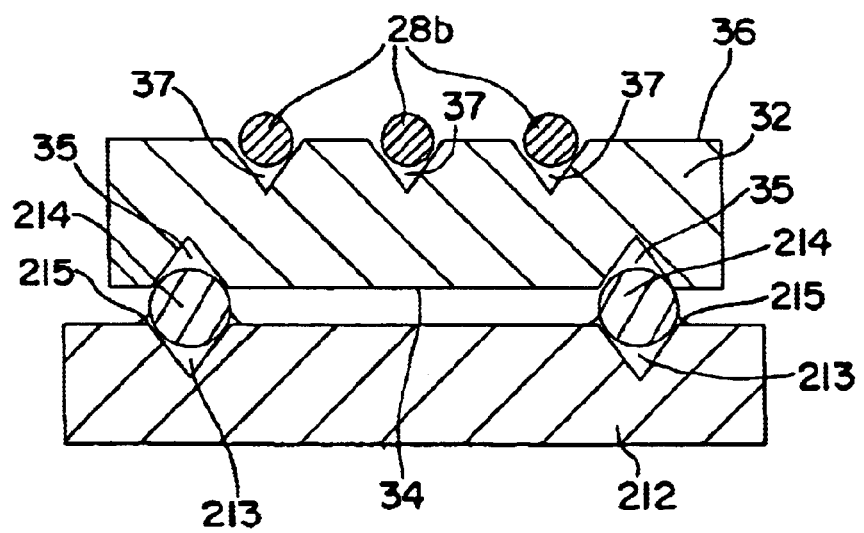
FIG. 4 is a cross-sectional view of an optical switch assembly constructed in accordance with another embodiment of the invention.

It should be further understood that the chip 32 may slide on mounting structures which are not integral with the base structure. As shown on FIG. 4, the chip 32 may be slidably mounted on a substrate 212. The substrate 212 differs from the substrate 12 and 112 in that it lacks integral rails, such as the rails 14 or 114, and instead has grooves 213. A fiber 214 is positioned in each groove 213, and the fibers 214 are held in place with an adhesive 215. Obviously, to prevent movement of the chip 22 (FIGS. 1–2), the chip 22 may be adhered to the fibers 214 or otherwise rendered immobile relative thereto. Alternatively, the fibers 214 may be bonded to the movable array 32 so that the movable array 32 moves by sliding the fibers 214 on the substrate 212.

Figure 5:
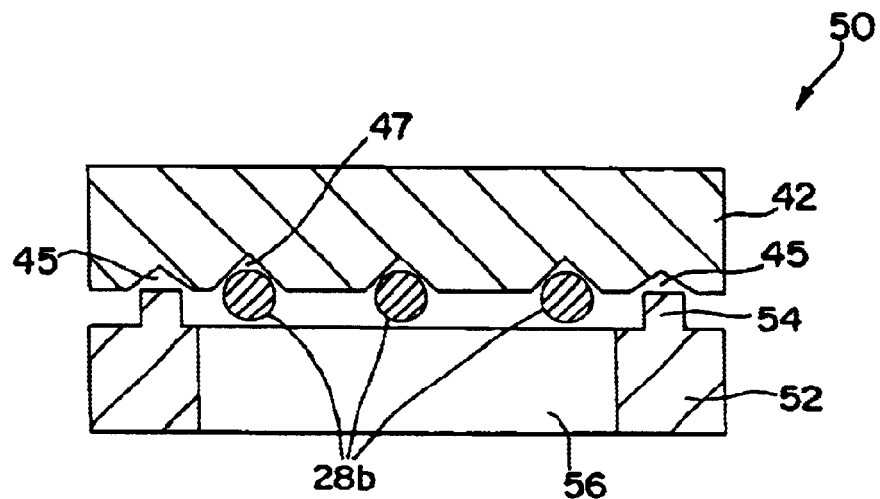
FIG. 5 is a cross-sectional view of an optical switch assembly constructed in accordance with another embodiment of the invention.
Figure 6:
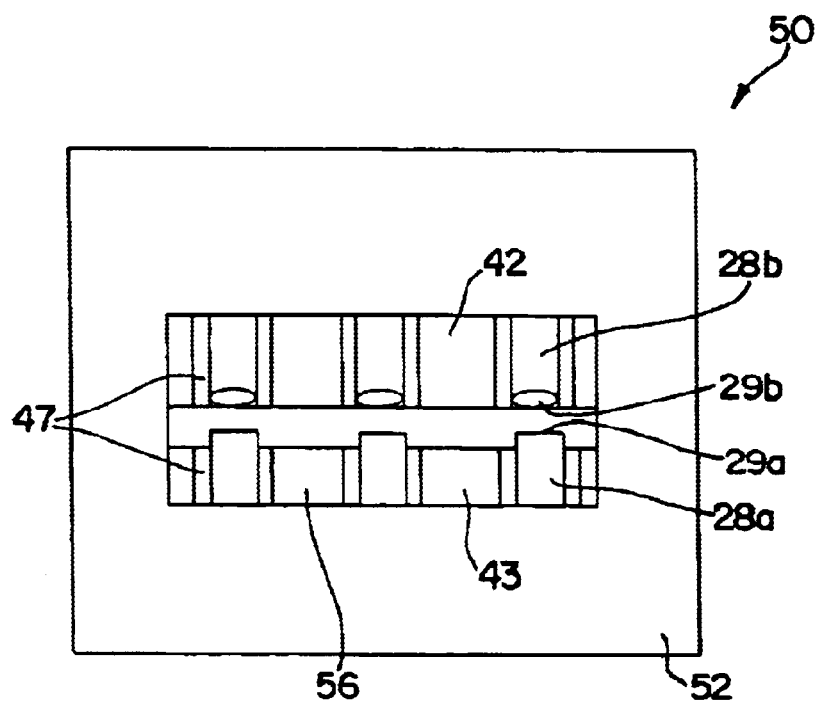
FIG. 6 is a bottom view of the optical switch assembly of FIG. 5.

Although FIGS. 1–4 illustrate optical switch assemblies having optical fibers mounted on an upper surface of a chip, i.e., the surface furthest from the substrate, it should be understood that the invention is not so limited. With specific reference to FIGS. 5–6, there is illustrated an optical switch assembly 50 having a pair of chips 42, 43 and a substrate 52. The chips 42, 43 include a first set of grooves 47 and a second set of grooves 45. The substrate 52 includes a pair of rails 54 and an opening 56. The chips 42, 43 are mounted on the substrate 52 such that the rails 54 are positioned within the second set of grooves 45. One of the chips 42, 43 is movable relative to the other chip and the substrate, while one of the chips 42, 43 is affixed to the substrate 52.

The optical fibers 28a, 28b are mounted within said first set of grooves 47 and are affixed therein through the use of an affixing mechanism, such as by laser welding or with an adhering material such as, for example, an epoxy. The opening 56 is sufficiently large to extend across all of the optical fibers mounted within the grooves 47. As shown the optical fiber arrays are in the opened position in that the endfaces 29a, 29b are separated a distance. In such a position, as light travels down one of the optical fibers, for example optical fiber 28b, the light meets the endface 29b, which acts as a dielectric interface, and is translated into reflected light which is reflected through the opening 56.

Figure 7:
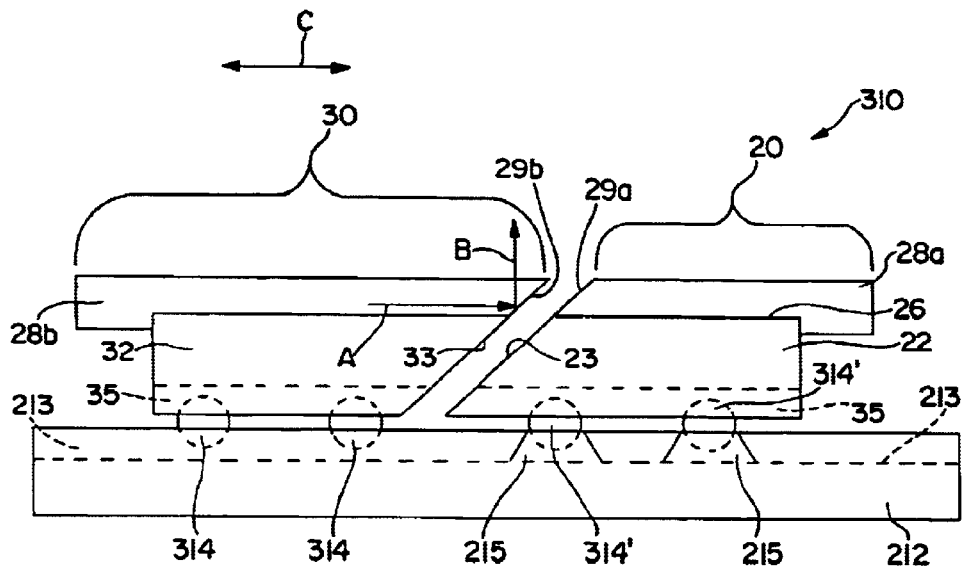
FIG. 7 is a side view of an optical switch assembly constructed in accordance with another embodiment of the invention.

It further should be understood that elements other than fibers may be utilized for mounting the support structures, As shown in FIG. 7, an optical switch assembly 310 is illustrated including the substrate 212, the fixed optical array 20 and the movable optical array 30. The optical arrays 20, 30 are each mounted on, respectively, spheres 314', 314. The spheres 314 beneath the movable optical array 30 seat within the grooves 213 of the substrate 212. The spheres 314' beneath the fixed optical array 20 are affixed to the grooves 213 with the adhesive 215. The movable optical array 30 moves with the spheres 314 along the grooves 213. Since the spheres 314' are fixed relative to the grooves 213, their immobility is translated to the fixed optical array 20. The spheres 314 are made of a material suitable for translating motion to the movable optical array, such as, for example, silica or alumina and the spheres 314' may be made from the same or different materials.

Figure 8:
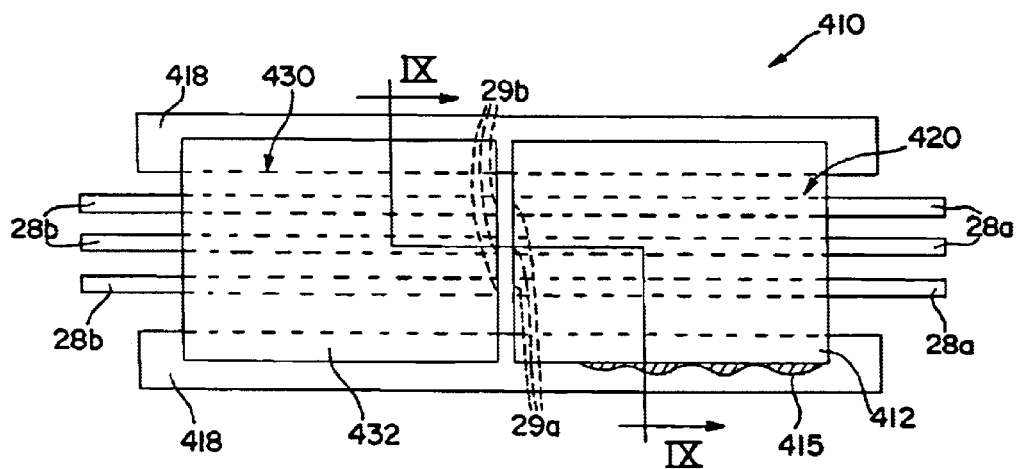
FIG. 8 is a top view of an optical switch assembly constructed in accordance with another embodiment of the invention.
Figure 9:
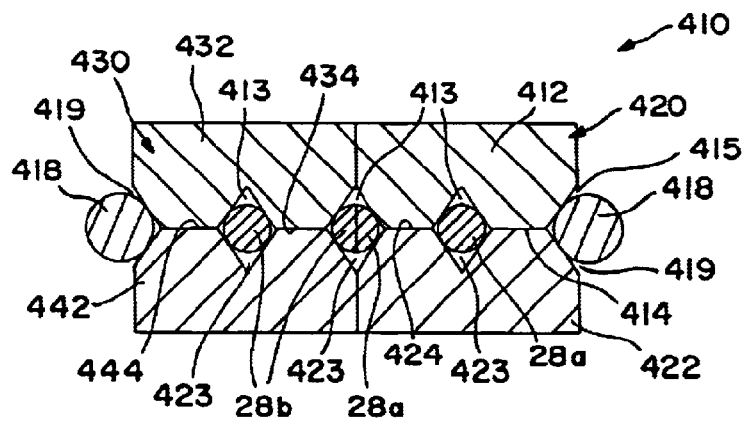
FIG. 9 is a cross-sectional view taken along line IX—IX of the optical switch assembly of FIG. 8.

FIGS. 8–9 illustrate another optical switch assembly 410, which includes a fixed optical array 420, a movable optical array 430, and a pair of fiber rails 418. As shown in FIG. 9, the fixed optical may 420 includes an upper fixed chip 412 and a lower fixed chip 422. The upper fixed chip 412 includes a surface 414 which mates with an opposite surface 424 on the lower fixed chip 422. Each of the chips 412, 422 includes grooves 413, 423, respectively, the surfaces 414, 424. The grooves 413 and 423 mate with each other, providing a space through which the optical fibers 28a extend. Each of the chips 412, 422 further include a cut-in portion 419 extending from an outer surface to, respectively, surfaces 414 and 424. The cut-in portions 419 mate to create a notch. Fiber rails 418 are positioned in the notches, and the upper and lower fixed arrays 412, 422 are adhered to the notches with an adhesive 415.

The movable optical array 430 includes an upper movable chip 432 and a lower movable chip 442. The upper movable chip 432 has a surface 434 in which are located grooves 413. The lower movable chip 442 has a surface 444 which includes grooves 423. The surfaces 434 and 444 mate up such that the grooves 413 and 423 create a space through which the optical fibers 28b extend. Each of the chips 432, 442 include cut-in portions 419 which mate to create a notch which extends from an outer surface to, respectively, the surfaces 434 and 444.

The optical fibers 28a may be adhered to the chips 412, 422 by mounting the fibers 28a in an adhesive material within the grooves 413, 423. Likewise, the optical fibers 28b may be adhered to the chips 432, 442 by adhering the fibers 28b in the grooves 413, 423.

Figure 10:
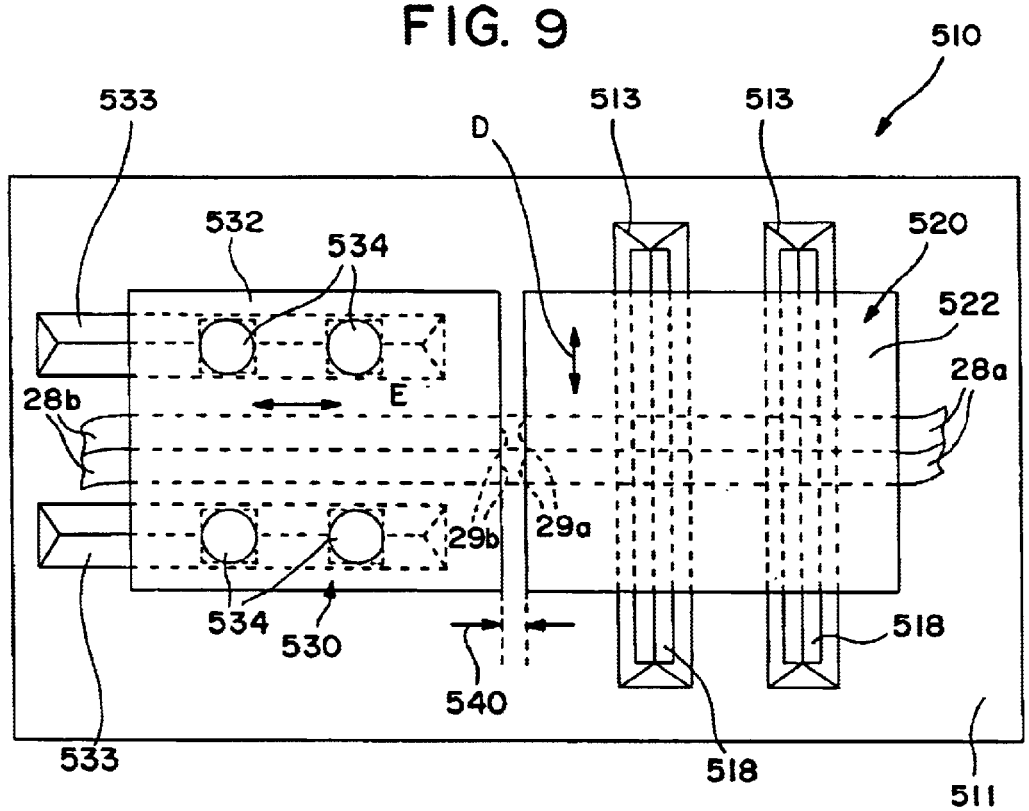
FIG. 10 is a top view of an optical switch assembly constructed in accordance with another embodiment of the invention.

FIG. 10 illustrates yet another embodiment of the invention. An optical switch assembly 510 is shown including a substrate 511, a fixed optical array 520, and a movable optical array 530. The substrate 511 includes a plurality of grooves 513 extending in a direction parallel to a direction D. The substrate 511 also includes plurality of grooves 533 extending in a direction parallel to a direction E. In each groove 513 is positioned a fiber rail 518, while in each groove 533 are positioned a plurality of spheres 534. The fiber rails 518 may be adhered to the grooves 513, but the spheres 534 remain mobile within the grooves 533.

The fixed optical array 520 includes a chip 522 though which extend openings (not shown). The optical fibers 28a are affixed to the chips 512 within the openings. The movable optical array 530 has a chip 532. Openings (not shown) extend through the chip 532 into which the optical fibers 28b are affixed.

In the assembly of the optical switch assembly 510, the chip 522 is mounted on the fiber rails 518 and the chip 532 is mounted on the spheres 534. The chips 522 and 532 are aligned such that the optical fiber ends 29a and 29b are accurately aligned. Specifically, the chip 522 is moved along the direction D and chip 532 is moved along the direction E. The chip 522 is then affixed to the fiber rails 518 or otherwise rendered immobile. The chip 532 remains movable on the spheres 534. As assembled, the chip 532 may be moved into contact with the chip 522 or out of contact such that a gap 540 exists between the chips 522, 532.

Figure 11:
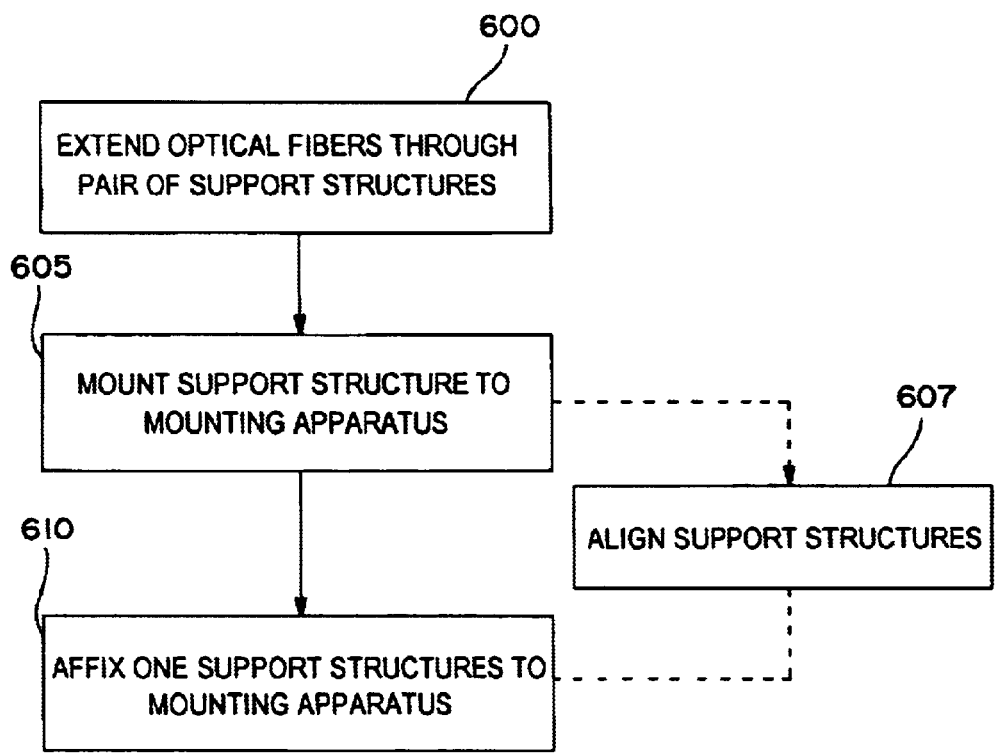
FIG. 11 is a flow diagram of steps taken to ensure accurate fiber to fiber alignment in an optical switch in accordance with an embodiment of the invention.

Next, with specific reference to FIG. 11, will be described a method for making an optical switch assembly. At step 600, a plurality of optical fibers are positioned within or on support structures, such as chips. The optical fibers may be affixed to grooves in or on the support structures. The support structures may include upper and lower portions with mating grooves.

At step 605, the support structures are mounted on a plurality of mounting structures. One of the support structures is affixed to, or otherwise render immobile relative to, the mounting structures. The mounting structures may take the form of rails integral with a base structure, such as a substrate. Instead, the mounting structures may be fiber rails, spheres, a combination of all of the above, or some other similar mounting structure.

Some of the grooves may be formed in a direction transverse to the direction of movement between the chips. In such an arrangement, the support structures may be aligned to each other, in step 607, by moving one of the support structures transverse to the other support structure to obtain an alignment of the optical fibers.

At step 610, one of the support structures is adhered to the mounting structures. In this way, one of the support structures can move in and out of contact with the other support structure thereby closing and opening the optical switch.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, although the optical switches have been shown and described with optical fibers having slanted endfaces and with chips having slanted faces, it should be noted that the invention is not so limited. The endfaces and the faces may be parallel to one another. Accordingly, the invention is not to be seen as limited by the foregoing description, but is only limited by the scope of the appended claims.

What is claimed as new and desired to be protected by Letters Patent of the United States is:

1. An optical switch assembly comprising:
   a fixed optical array;
   a movable optical array;
   a plurality of first optical fibers mounted on said fixed optical array and a plurality of second optical fibers mounted on said movable optical array; and
   a mounting apparatus comprising a plurality of mounting structures, wherein said fixed optical array is immobile relative to said mounting apparatus and said movable optical array is movable relative to said mounting apparatus along the direction of the optical axis of a selected one of said second optical fibers to an open switch position on the mounting apparatus wherein light transmitted from a selected one of said second optical fibers is deflected so that the deflected light is not received by said first fibers.

2. The optical switch assembly of claim 1, wherein said fixed optical array comprises an upper chip mated to a lower chip, said chips comprising grooves which mate to receive said first optical fibers and cut-in portions which create a notch between said upper and lower chips, and said movable optical array comprises an upper chip mated to a lower chip, said chips comprising grooves which mate to receive said second optical fiber and cut-in portions which create a notch between said upper and lower chips.

3. The optical switch array of claim 2, wherein a pair of fiber are positioned in said notches, said movable optical array being movable along said fibers and said fixed optical array being affixed to said fibers.

4. An optical switch assembly comprising:
   a fixed optical array comprising at least one chip with a plurality of first and second grooves;
   a movable optical array comprising at least one chip with a plurality of first and second grooves;
   a plurality of first optical fibers mounted on said fixed optical array and a plurality of second optical fibers mounted on said movable optical array, wherein said first grooves of said fixed optical array are adapted to receive said first optical fibers and said first grooves of said movable optical array are adapted to receive said second optical fibers; and
   a mounting apparatus comprising a plurality of mounting structures, said fixed optical array being immobile relative to said mounting apparatus and said movable optical array being movable along said mounting apparatus, wherein said second grooves of said fixed optical array are adapted to receive said mounting structures and said second grooves of said movable optical array are adapted to receive said mounting structures, wherein said mounting structures comprise at least one member chosen from rails, fibers, and spheres, and wherein said mounting apparatus comprises a substrate.

5. The optical switch assembly of claim 4, wherein said rails are integral with said substrate.

6. The optical switch assembly of claim 5, wherein said rails have a rectangular profile.

7. The optical switch assembly of claim 5, wherein said rails have a semi-circular profile.

8. The optical switch assembly of claim 4, wherein said substrate comprises an opening.

9. The optical switch assembly of claim 8, wherein when said chips are mounted on said substrate, said first and second grooves are on a surface of said chips closest to said substrate.

10. The optical switch assembly of claim 4, wherein said substrate comprises a plurality of first grooves.

11. The optical switch assembly of claim 10, wherein said mounting structures comprise fibers affixed to said plurality of first grooves in said substrate.

12. The optical switch assembly of claim 10, wherein said mounting structures comprise a first plurality of spheres affixed to said first grooves in said substrate and a second plurality of movable spheres positioned within said first grooves in said substrate, said fixed optical array being mounted on said affixed spheres and said movable optical array being mounted on said movable spheres.

13. The optical switch assembly of claim 4, wherein said substrate comprises a first plurality of grooves and a second plurality of grooves extending in a transverse direction to said first plurality of grooves.

14. The optical switch assembly of claim 13, further comprising first mounting structures positioned in said substrate first plurality of grooves, said fixed optical array being affixed to said first mounting structures.

15. The optical switch assembly of claim 14, further comprising second mounting structures in said substrate second plurality of grooves, said movable optical array being movable on said second mounting structures.

16. A method for making an optical switch assembly, comprising:
    positioning a plurality of first optical fibers in a first support structure and a plurality of second optical fibers in a second support structure;
    providing mounting structures located on at least one mounting apparatus comprising the steps of locating a plurality of grooves within a base structure, positioning a fiber within each said groove, and affixing said fibers to said grooves;

mounting said first and second support structures on said at least one mounting apparatus, by positioning grooves, located on said first and second support structures, on said mounting structures; and affixing one of said first and second support structures to said mounting apparatus.

17. The method of claim 16, wherein one of said first and second support structures is affixed to said base structure fibers.

18. A method for making an optical switch assembly, comprising:

positioning a plurality of first optical fibers in a first support structure and a plurality of second optical fibers in a second support structure;

providing mounting structures located on at least one mounting apparatus comprising the steps of locating a plurality of grooves within a base structure, positioning a first and a second plurality of spheres within said grooves, and affixing said first plurality of spheres to said grooves;

mounting said first and second support structures on said at least one mounting apparatus, by positioning grooves, located on said first and second support structures, on said mounting structures; and affixing one of said first and second support structures to said mounting apparatus.

19. The method of claim 18, wherein one of said first and second support structure is affixed to said first plurality of spheres.

20. A method for making an optical switch assembly, comprising:

positioning a plurality of first optical fibers in a first support structure and a plurality of second optical fibers in a second support structure;

mounting said first and second support structures on at least one mounting apparatus, by positioning grooves, located on said first and second support structures, on mounting structures located on said mounting apparatus, wherein said mounting comprises positioning a pair of fibers within cut-portions of said first and second support structures and affixing one of said first and second support structures to said pair of fibers; and affixing one of said first and second support structures to said mounting apparatus.

21. The method of claim 20, wherein said first and second support structures each comprise upper and lower support portions, each said portion comprising a pair of said cut-in portions, wherein said cut-in portions of said upper support portion mate with said cut-in portions of said lower support portion to create notches for receiving said pair of fibers.

22. A method for making an optical switch assembly, comprising:

positioning a plurality of first optical fibers in a first support structure and a plurality of second optical fibers in a second support structure;

providing mounting structures located on at least one mounting apparatus comprising the steps of providing a first plurality and second plurality of grooves in a base structure, said first plurality of grooves being transverse to said second plurality of grooves, positioning a plurality of mounting structures within said base structure grooves, and affixing one of said first and second support structures to said mounting structures in said first plurality of grooves in said base structure;

mounting said first and second support structures on said at least one mounting apparatus, by positioning grooves, located on said first and second support structures, on said mounting structures; and affixing one of said first and second support structures to said mounting apparatus.

23. The method of claim 22, wherein prior to said affixing, said first and second support structures are moved along said mounting structures to align said plurality of first optical fibers with said plurality of second optical fibers.

24. An optical switch assembly comprising:

a mounting apparatus wherein said mounting apparatus comprises a plurality of mounting structures which comprise at least one member chosen from rails, fibers, and spheres and wherein a respective mounting structure is engaged with a respective second groove of the fixed and movable arrays and wherein said mounting apparatus comprises a substrate;

a fixed optical array comprising at least one chip with a plurality of first and second grooves, said fixed optical array being immobile relative to said mounting apparatus;

a movable optical array comprising at least one chip with a plurality of first and second grooves, said movable optical array being movable along with said mounting apparatus along the direction of the longitudinal axis of a selected one of said second grooves of the movable array;

a plurality of first optical fibers mounted in said first grooves of said fixed optical array; and a plurality of second optical fibers mounted in said first grooves of said movable optical array.

25. The optical switch assembly of claim 24, wherein said rails are integral with said substrate.

26. The optical switch assembly of claim 25, wherein said rails have a rectangular profile.

27. The optical switch assembly of claim 25, wherein said rails have a semi-circular profile.

28. The optical switch assembly of claim 25, wherein when said chips are mounted on said substrate and wherein said first and second grooves are on a surface of said chips closest to said substrate.

29. The optical switch assembly of claim 24, wherein said substrate comprises a plurality of first grooves.

30. The optical switch assembly of claim 29, wherein said mounting structures comprise fibers affixed to said plurality of first grooves in said substrate.

31. The optical switch assembly of claim 29, wherein said mounting structures comprise a first plurality of spheres affixed to said first grooves in said substrate and a second plurality of movable spheres positioned within said first grooves in said substrate, said fixed optical array being mounted on said affixed spheres and said movable optical array being mounted on said movable spheres.

32. The optical switch assembly of claim 24, wherein said substrate comprises a first plurality of grooves and a second plurality of grooves extending in a transverse direction to said first plurality of grooves.

33. The optical switch assembly of claim 32, comprising first mounting structures positioned in said substrate first plurality of grooves, said fixed optical array being affixed to said first mounting structures.

34. The optical switch assembly of claim 33, comprising second mounting structures in said substrate second plurality of grooves, said movable optical array being movable on said second mounting structures.

35. An optical switch assembly comprising:
a first waveguide holding member holding an optical waveguide, the optical waveguide having an endface disposed at an angle relative to the optical axis of the waveguide such that an axial ray incident on the endface substantially undergoes total internal reflection when the switch is in the open position;
a second waveguide holding member holding an optical waveguide, the optical waveguide of the second waveguide holding member having an endface disposed at an angle relative to the optical axis of the waveguide of the second waveguide holding member such that an axial ray incident on the endface of the waveguide of the second waveguide holding member substantially undergoes total internal reflection when the switch is in the open position; and
a base comprising a mounting structure movably attached to the first and second waveguide holding members so that at least a selected one of the first and second waveguide holding members may be moved relative to the other waveguide holding member along a selected path to effect switching of the switch.

36. The optical switch according to claim 15, wherein the endface of the optical waveguide of the first waveguide holding member is disposed in a plane parallel to the plane containing the endface of the optical waveguide of the second waveguide holding member.

37. The optical switch according to claim 36, wherein the selected waveguide holding member is movable relative to the other waveguide holding member so that the respective waveguide end faces of the first and second waveguide holding members may be positioned sufficiently close so as to frustrate the total internal reflection at the waveguide end faces to effect optical coupling between the optical waveguides of the first and second waveguide holding members.

38. The optical switch according to claim 37, wherein the selected waveguide holding member is slidably disposed on the mounting structure.

39. The optical switch according to claim 37, wherein the optical axes of the optical waveguides are collinear.

40. The optical switch according to claim 37, wherein the mounting structure comprises at least one protrusion and the waveguide holding members each comprise a groove slidably engaged with the protrusion.

41. The optical switch according to claim 40, wherein the protrusion comprises at least one member chosen from a rail, a sphere, and a fiber.

42. The optical switch according to claim 37, wherein the waveguide holding members each comprise at least one protrusion and the mounting structure comprises a groove engaged with the protrusions.

43. The optical switch according to claim 42, wherein the protrusion comprises at least one member chosen from a rail, a sphere, and a fiber.

44. The optical switch according to claim 37, wherein the path extends along the direction of the optical axis of the optical waveguide of the first waveguide holding member.

45. The optical switch according to claim 37, wherein the path extends along a direction perpendicular to the optical axis of the optical waveguide of the first waveguide holding member.

46. The optical switch according to claim 37, wherein the first and second waveguide holding members each comprise a micromachined silicon chip.

47. The optical switch according to claim 46, wherein the waveguides of each waveguide holding member comprise an optical fiber and the silicon chips each comprise a V-groove in which a respective one of the optical fibers is disposed.

48. The optical switch according to claim 46, wherein the silicon chips each comprise a V-groove disposed in engagement with the mounting structure.

49. The optical switch according to claim 48, wherein the mounting structure comprises at least one member chosen from a rail, a sphere, and a fiber.

50. The optical switch according to claim 48, wherein the base comprises a V-groove silicon chip and the mounting structure comprises at least one of a sphere or a fiber disposed in the V-groove of the base.

* * * * *